(12) United States Patent
Zhu et al.

(10) Patent No.: US 11,540,172 B2
(45) Date of Patent: Dec. 27, 2022

(54) LOAD RELOCATION IN A COMMUNICATIONS NETWORK

(71) Applicant: HUAWEI TECHNOLOGIES CO., LTD., Guangdong (CN)

(72) Inventors: Fenqin Zhu, Shanghai (CN); Wenfu Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 530 days.

(21) Appl. No.: 16/405,734

(22) Filed: May 7, 2019

(65) Prior Publication Data

US 2019/0268806 A1 Aug. 29, 2019

Related U.S. Application Data

(63) Continuation of application No. PCT/CN2018/084298, filed on Apr. 24, 2018.

(30) Foreign Application Priority Data

Apr. 25, 2017 (CN) .......................... 201710279147.2
Oct. 12, 2017 (CN) .......................... 201710949276.8

(51) Int. Cl.
*H04W 28/08* (2009.01)
*H04W 28/02* (2009.01)
(Continued)

(52) U.S. Cl.
CPC ....... *H04W 28/08* (2013.01); *H04W 28/0242* (2013.01); *H04W 28/0247* (2013.01);
(Continued)

(58) Field of Classification Search
CPC ............. H04W 28/08; H04W 28/0804; H04W 28/0831; H04W 28/0842; H04W 28/0242;
(Continued)

(56) References Cited

U.S. PATENT DOCUMENTS

| | | | |
|---|---|---|---|
| 2015/0223284 A1* | 8/2015 | Jain ...................... | H04W 72/042 370/329 |
| 2016/0037421 A1* | 2/2016 | Jokinen ................. | H04W 36/22 455/436 |

(Continued)

FOREIGN PATENT DOCUMENTS

| | | |
|---|---|---|
| CN | 101039506 A | 9/2007 |
| CN | 103188729 A | 7/2013 |

(Continued)

OTHER PUBLICATIONS

3GPP TS 23.501 V0.3.1 (Mar. 2017),3rd Generation Partnership Project;Technical Specification Group Services and System Aspects; System Architecture for the 5G System;Stage 2(Release 15),total 97 pages.

(Continued)

*Primary Examiner* — Ian N Moore
*Assistant Examiner* — Brian T Le
(74) *Attorney, Agent, or Firm* — Leydig, Voit & Mayer, Ltd.

(57) ABSTRACT

This application discloses a load relocation method, apparatus, and a system. The method includes determining, by a communications network entity, a target access management entity for load relocation; and sending, to an access network entity, an identifier of an original access management entity and an identifier of the target access management entity or an address of the target access management entity with respect to the access network entity. The access network entity sends a message from UE to the target access management entity based on the identifier of the original access management entity carried in the message from the UE. In the foregoing solution, signaling overheads in a load relocation process are reduced and load relocation efficiency is improved.

22 Claims, 7 Drawing Sheets

(51) Int. Cl.
*H04W 36/08* (2009.01)
*H04W 36/00* (2009.01)
*H04W 36/10* (2009.01)

(52) U.S. Cl.
CPC ....... *H04W 36/0033* (2013.01); *H04W 36/08* (2013.01); *H04W 36/10* (2013.01)

(58) Field of Classification Search
CPC ............. H04W 28/0247; H04W 36/22; H04W 36/0033; H04W 36/0038; H04W 36/0044; H04W 36/08; H04W 36/10; H04W 36/38; H04W 36/385; H04W 40/04; H04W 48/06; H04L 47/125
See application file for complete search history.

(56) References Cited

U.S. PATENT DOCUMENTS

| 2016/0088518 | A1* | 3/2016 | Qian | ................... | H04W 8/26 |
| | | | | | 370/230 |
| 2017/0311150 | A1* | 10/2017 | Zhang | ................... | H04W 8/12 |
| 2018/0270666 | A1* | 9/2018 | Lee | ................... | H04L 63/205 |

FOREIGN PATENT DOCUMENTS

| CN | 105516959 | A | 4/2016 |
|----|-----------|---|--------|
| EP | 2733980 | A1 | 5/2014 |
| EP | 2800413 | B1 | 11/2014 |
| EP | 2819455 | A1 | 12/2014 |
| JP | 2011527162 | A | 10/2011 |
| WO | 2007107088 | A1 | 9/2007 |
| WO | 2013016842 | A1 | 2/2013 |
| WO | 2013125150 | A1 | 8/2013 |
| WO | 2015198508 | A1 | 12/2015 |

OTHER PUBLICATIONS

3GPP TS 23.502 V0.3.0 (Mar. 2017),3rd Generation Partnership Project;Technical Specification Group Services and System Aspects;Procedures for the 5G System; Stage 2 (Release 15),total 115 pages.

S2-171885 Lenovo, Motorola Mobility,"TS 23.501: Proposals for change of AMF",SA WG2 Meeting #120,Mar. 27-31, 2017, Busan, Korea,total 3 pages.

Ericsson, "AMF Selection Terminology & Scenarios," SA WG2 Meeting #120, Busan, Korea, S2-171811, total 17 pages, 3rd Generation Partnership Project, Valbonne, France (Mar. 27-31, 2017).

Huawei, HiSilicon, "TS23.501: AMF Stickiness," SA WG2 Meeting #119, Dubrovnik, Croatia, S2-170984, total 6 pages, 3rd Generation Partnership Project, Valbonne, France (Feb. 13-17, 2017).

Nokia, Cisco Systems, Inc., "Way forward for change of AMF / Control of N2 persistence," SA WG2 Meeting #119, Dubrovnik, Croatia, S2-171485, total 17 pages, 3rd Generation Partnership Project, Valbonne, France (Feb. 13-17, 2017).

\* cited by examiner

LOAD RELOCATION IN A COMMUNICATIONS NETWORK

CROSS-REFERENCE TO RELATED APPLICATIONS

This application is a continuation of International Application No. PCT/CN2018/084298, field on Apr. 24, 2018, which claims priority to Chinese Application No. 201710279147.2, filed on Apr. 25, 2017 and to Chinese Application No. 201710949276.8, filed on Oct. 12, 2017. The disclosures of the aforementioned applications are hereby incorporated by reference in their entireties.

TECHNICAL FIELD

This application relates to the field of communications technologies, and in particular, to a method, an apparatus, and a system for load relocation in a communications network.

BACKGROUND

In a 4th generation (4G) communications network, when UE (User equipment, user equipment) registers with the communications network, the communications network allocates, to the UE, an Mobility Management Entity (MME) that is responsible for mobility management of the UE. In scenarios such as network upscaling/downscaling and an MME failure in which the MME cannot continue serving the UE, the UE needs to be moved to another MME. In the 4G communications network, a procedure of changing a serving MME of UE is relatively complex. If the UE is in an idle mode, the network pages the UE and instructs the UE to initiate location update, and the UE is handed over to a new MME in a location update process. Therefore, changing a serving MME of UE requires triggering of a relatively large quantity of air interface signaling (for example, in a paging process and a location update process). When a relatively large quantity of UEs need to be moved, air interface signaling increases abruptly. To avoid an air interface signaling storm, an existing solution is handover in batches. However, handover in batches is too slow to reduce a load of the MME in time, and therefore is unhelpful for load balancing on the network.

In a 5th generation (5G) communications network, functional network elements in a core network are to be implemented based on virtualization technologies, and it can be foreseen that frequent upscaling, downscaling, addition, and removal of network functions occur in network deployment of an operator. The MME load relocation method in 4G is inappropriate for such 5G network scenarios characterized by flexible deployment and frequent changes.

SUMMARY

Embodiments of this application provide a load relocation method, apparatus, and system, to resolve problems, for example, functional entities of a core network occupy excessive air interface resources and have low load relocation efficiency in a load relocation process.

To achieve the foregoing objective, the embodiments of this application provide the following technical solutions:

According to a first aspect, an embodiment of this application provides a load relocation method, so that some or all UEs currently served by an original access management entity for load relocation are moved to a target access management entity, where the method includes: first determining, by a communications network entity, the target access management entity for load relocation, and sending, to an access network entity, a correspondence between identifiers of original access management entities and addresses of target access management entities with respect to the access network entity. The access network entity can obtain, from messages from UEs or contexts of UEs that are stored in the access network entity, identifiers of access management entities currently serving the UEs. Therefore, the access network entity can determine, based on the identifiers of original access management entities that are sent by the communications network entity, which UEs need to be moved and can further learn, based on the addresses of the target access management entities with respect to the access network entity that are corresponding to the identifiers of the original access management entities, which target access management entities the UEs need to be moved to and which addresses the messages from the UEs need to be forwarded to. In this way, the communications network entity does not need to send a load relocation instruction or message to the access network entity for each UE, thereby reducing signaling overheads and improving load relocation efficiency. Also, the access network entity does not need to instruct the UEs to initiate location update procedures to make the access network entity reselect access management entities for the UEs. This reduces air interface signaling and saves air interface resources.

In a possible design, to make the target access management entity use the identifier of the original access management entity as an identifier of the target access management entity after load relocation, the communications network entity further needs to send the identifier of the original access management entity to the target access management entity. Therefore, after a load of the original access management entity is relocated to the target access management entity, the target access management entity may use the identifier of the original access management entity to serve UE. For example, when new UE is connected to or registers with the target access management entity, and the target access management entity allocates a temporary identifier to the UE, an identifier of an access management entity included in the temporary identifier may be the identifier of the original access management entity. The identifier of the access management entity is also a type of network resource and needs to be planned and configured based on a network capacity and deployment. This ensures that the identifier of the access management entity, as a network resource, is not wasted.

In a possible design, the communications network entity may be the original access management entity; and to make the target access management entity able to serve the to-be-moved UE normally, the original access management entity further needs to send a context of the to-be-moved UE to the target access management entity or a data storage functional entity. Therefore, after the access network entity sends a message of the UE to the target access management entity, the target access management entity can continue serving the UE based on the received context of the UE or the context of the UE obtained from the data storage functional entity. Load relocation inside a communications network does not affect services of the UE, and the UE is also unaware of change of the access management entity. For example, the target access management entity may forward, to the session management entity for processing, the message from the UE based on an identifier or an address of a session management entity currently serving the UE that is stored in the context of the UE.

In a possible design, the communications network entity may be the original access management entity; and to make the session management entity currently serving the UE still able to find, after load relocation, the access management entity currently serving the UE, namely, the target access management entity, the original access management entity further needs to send, to the session management entity currently serving the to-be-moved UE, a correspondence between the identifier of the original access management entity and an address of the target access management entity with respect to the session management entity. In this way, because the session management entity has stored the identifier of the access management entity currently serving the UE, when the session management entity receives a downlink message addressed to the UE, the session management entity can send, based on the identifier of the original access management entity, the message addressed to the UE to the corresponding target access management entity.

In a possible design, the communications network entity may be an operation and maintenance entity; and to make the original access management entity clear which UEs are to be moved to which target access management entity, the operation and maintenance entity needs to send, to the original access management entity, the identifier of the original access management entity for relocation and addresses of target access management entities with respect to the original access management entity. Because a temporary identifier allocated by the original access management entity to UE served by the original access management entity includes an identifier of the original access management entity, while it is assumed that the original access management entity includes a plurality of identifiers, the original access management entity can determine, based on the identifier of the original access management entity sent by the operation and maintenance entity, the to-be-moved UEs. Moreover, the addresses of target access management entities with respect to the original access management entity can help the original access management entity send contexts of the to-be-moved UEs to the target access management entities.

According to a second aspect, an embodiment of this application provides a load relocation method, where the method includes: receiving, by an access network entity, a correspondence, sent by a communications network entity, between identifiers of original access management entities and addresses of target access management entities with respect to the access network entity; and sending, by the access network entity to an address of a target access management entity with respect to the access network entity, a message from UE based on an identifier of an original access management entity that is carried in the received message from the UE or based on an identifier of an original access management entity currently serving the UE that is stored in the access network entity. In this way, the access network entity stores, based on an indication of the communications network entity, a correspondence between access management entity identifiers and access management entity addresses. When receiving a message from UE, the access network entity can directly find, based on an identifier of an access management entity that is included in the message from the UE or an identifier of an access management entity serving the UE that is stored in the access network entity, an address of an access management entity corresponding to the identifier. Regardless of load relocation between access management entities in a communications network, the access network entity can always send the message from the UE, to a correct access management entity without a need of redirection between access management entities. In addition, the access management entity only needs to perform message forwarding based on the correspondence specified by the communications network entity, to ensure load balancing between access management entities. This simplifies complexity of message forwarding by the access network entity. For example, when performing message forwarding, the access network entity no longer needs to select an access management entity based on a load balancing algorithm.

In a possible design, a context of UE stored in the access network entity includes an identifier of an access management entity currently serving the UE and an address of the access management entity with respect to the access network entity; and the access network entity determines a to-be-updated context of UE based on a received identifier of an original access management entity, and sets an address, included in the context of the UE, of an access management entity serving the UE with respect to the access network entity to an invalid value. In this way, when the access network entity receives a message from the UE, the access network entity determines that the address, included in the context of the UE, of the access management entity serving the UE with respect to the access network entity is an invalid value, and the access network entity obtains, from the context of the UE, the identifier of the original access management entity, and determines, based on the identifier of the original access management entity, an address of a corresponding target access management entity with respect to the access network entity. The access network entity sends the message from the UE, to the address of the target access management entity with respect to the access network entity.

In a possible design, a context of UE stored in the access network entity includes an identifier of an access management entity currently serving the UE and an address of the access management entity with respect to the access network entity; and the access network entity determines a to-be-updated context of UE based on a received identifier of an original access management entity, and sets an address, included in the context of the UE, of the access management entity serving the UE with respect to the access network entity as an address of a target access management entity with respect to the access network entity. In this way, when the access network entity receives a message from the UE, the access network entity directly sends the message to the target access management entity based on the address of the access management entity with respect to the access network entity that is recorded in the context of the UE.

In a possible design, the access network entity receives a message from UE; the access network entity obtains, from the message, an identifier of an original access management entity and determines, based on the identifier of the original access management entity, an address of a corresponding target access management entity with respect to the access network entity; and the access network entity sends the message from the UE, to the address of the target access management entity with respect to the access network entity.

In a possible design, the communications network entity may be the original access management entity or an operation and maintenance entity.

According to a third aspect, an embodiment of this application provides a communications network entity for load relocation, where the communications network entity has functions of implementing actions of the communications network entity in the method according to the first aspect. The functions may be implemented by hardware or by executing corresponding software by hardware. The hardware or software includes one or more modules corresponding to the functions.

In a possible design, the communications network entity is a computer device, including a processor, a memory, a bus, and a communications interface, where the memory is configured to store a computer executable instruction, the processor is connected to the memory by using the bus, and when the device runs, the processor executes the computer executable instruction stored in the memory, so that the communications network entity performs the load relocation method according to any design of the first aspect.

According to a fourth aspect, an embodiment of this application provides an access network entity for load relocation, where the access network entity has functions of implementing actions of the access network entity in the method according to the second aspect. The functions may be implemented by hardware or by executing corresponding software by hardware. The hardware or software includes one or more modules corresponding to the functions.

According to a fifth aspect, an embodiment of this application provides a computer-readable storage medium, where the computer-readable storage medium stores an instruction, and when the computer-readable storage medium runs on a computer, the computer performs the method according to the first aspect or the second aspect.

According to a sixth aspect, an embodiment of this application provides a computer program product, and when the product runs on a computer, the computer performs the method according to the first aspect or the second aspect.

According to a seventh aspect, an embodiment of this application provides a load relocation system, including the communications network entity and the access network entity according to the foregoing aspects.

In the embodiments of this application, names of the access network entity, the access management entity, the session management entity, and the operation and maintenance entity do not limit the entities. In actual implementation, these entities may be present in other names. All names fall within the protection scope of this application provided that functions of the entities are similar to those in this application or that an entity has a plurality of functions and one or more of the functions are similar to functions in this application.

DESCRIPTION OF EMBODIMENTS

The following describes the technical solutions in the embodiments of this application with reference to the accompanying drawings in the embodiments of this application.

Figure 1A:
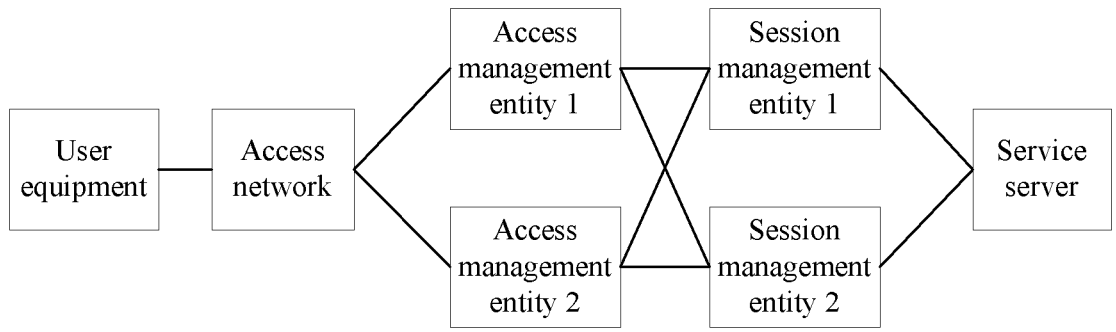
FIG. 1a is a schematic diagram of a possible system network according to an embodiment of this application.

The embodiments of the present invention provide a load relocation method. The method may be applied to a system architecture or an application scenario shown in FIG. 1a. As shown in FIG. 1a, user equipment is connected to an access management entity by using an access network entity; the access management entity performs access authentication and connectivity management on the user equipment; and the access management entity establishes, for the user equipment by using a session management entity, a connection to a service server or another network or device. There may be a plurality of access management entities in a communications network shown in FIG. 1a, for example, an access management entity 1 and an access management entity 2. When the access management entity 1 is unable to continue providing a connectivity management service for the user equipment, the user equipment needs to be moved to the access management entity 2 and the access network entity is instructed to forward a message of the user equipment to the access management entity 2, so that the user equipment is served normally. In actual network deployment, there may be an operation and maintenance entity (not shown in the figure) in the communications network to perform maintenance and management on entities or devices in the system. For example, the operation and maintenance entity is connected to devices such as the access management entity, the session management entity, and the RAN; and the operation and maintenance entity may send messages to the devices such as the access management entity, the session management entity, and the RAN, to perform remote operation and maintenance such as configuration and initialization on these devices.

In this embodiment of this application, the access management entity, the session management entity, and the operation and maintenance entity may all be referred to as a communications network entity. Names of the entities in FIG. 1a do not limit the entities. For example, the "access management entity" may alternatively be replaced with an "access and mobility management functional entity" or other names; and the "session management entity" may alternatively be replaced with a "session management function" or other names. In addition, the access management entity may alternatively be corresponding to an entity that includes other functions besides a mobility management function. The session management entity may alternatively be corresponding to an entity that includes other functions besides a session management function. A general explanation is provided now and no more details are described below.

Figure 1B:
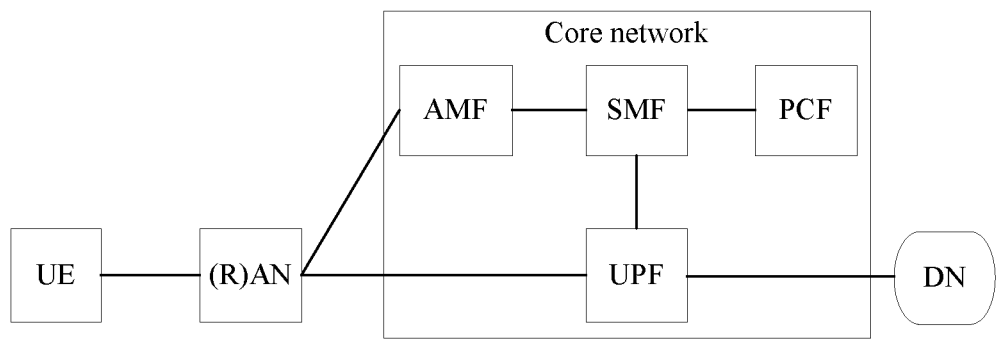
FIG. 1b is a schematic diagram of a possible 5G network architecture according to an embodiment of this application.
Figure 2:
FIG. 2 is a schematic diagram of possible composition of a temporary identifier of user equipment according to an embodiment of this application.

FIG. 1b is a possible communications system instance of FIG. 1a. FIG. 1b includes (User equipment (UE), a radio access network (RAN), a core network, and a Data Network (DN). The user equipment is connected to the core network by using the RAN and is connected to the DN by using the core network, to have services provided by the DN. The core network includes an Access and Mobility Management Function (AMF), an Session Management Function (SMF), a Policy Control function (PCF), and a User plane Function (UPF). In the system architecture shown in FIG. 1b, the RAN is an instance of the access network entity in FIG. 1a, the AMF is an instance of the access management entity in FIG. 1a, and the SMF is an instance of the session management entity in FIG. 1a. The UE is connected to the AMF by using the RAN. The AMF provides an access and mobility management service for the UE. To be specific, the AMF performs authentication on a user requesting access and performs management (for example, connectivity management and mobility management) on user equipment connected to the core network by using the AMF. The SMF obtains a policy related to the UE from the PCF, and controls the UPF to establish a connection to the DN for the UE according to the related policy. The core network further allocates a temporary identifier to UE that has been connected or attached to the core network. A format of the temporary identifier is shown in FIG. 2, including a Public Land Mobile Network identification (PLMN ID), an AMF group ID (AMF group identifier), an AMF identifier (AMF ID), and a UE identifier (UE ID). It should be noted that the names and deployment forms of the core network entities in this embodiment of this application are only examples and do not limit the technical solutions of this application and related functional entities. Any variations to the names of, locations of, and interactions between these network entities in the future shall fall within the protection scope of this application provided that these network entities have the functions of the network entities in the embodiments of this application. For example, a device having an AMF or SMF function may be referred to as an AMF or an SMF, or may be referred to as an AMF instance or an SMF instance, an AMF device or an SMF device, or an AMF functional entity or an SMF functional entity. Likewise, the technical solutions described in the embodiments of this application are not limited to the network entities in the communications system shown in FIG. 1b. Network entities in other types of networks shall all fall within the protection scope of this application provided that these network entities have the functions of the network entities in the embodiments of this application.

When an AMF performs load redistribution, for example, when the AMF is shut down or scaled down, the AMF needs to hand over UEs currently managed by the AMF, in other words, UEs currently served by the AMF or UEs currently registered with the AMF, to another AMF. For this purpose, the embodiments of this application provide a technical solution: A RAN stores AMF routing information, including a correspondence between AMF IDs and AMF addresses; and when an AMF intends to hand over some or all UEs managed by the AMF to another AMF, the AMF or an operation and maintenance (O&M) entity sends, to the RAN, AMF routing information effective after load relocation, for example, an AMF address corresponding to the AMF ID effective after load relocation, in other words, an address of a target AMF for load relocation. A new AMF ID further needs to be carried when a length of the AMF ID changes. When the RAN receives a Non Access Stratum (NAS) message from UE, the RAN determines, based on an AMF ID included in a temporary identifier of the UE, an AMF address corresponding to the AMF ID and forwards, to the AMF address, the message sent by the UE. According to the technical solution provided in the embodiments of this application, the characteristic that a temporary identifier of UE includes an AMF ID of an AMF which the UE registers with or that serves the UE is utilized, and an AMF address corresponding to the AMF ID is updated to the RAN, so that the RAN can determine, based on the AMF ID in the temporary identifier of the UE, an address of a target AMF for load relocation, and further forward a message of the UE to the target AMF for load relocation. This meets load redistribution or load relocation requirements of a 5G core network. A person skilled in the art may figure out that a core network element may send, to the RAN in another manner, the AMF routing information effective after load relocation. For example, the core network element sends, to the RAN, an identifier of an original AMF for load relocation and the identifier of the target AMF for load relocation; and the RAN may obtain, based on the identifier of the target AMF, an AMF address corresponding to the identifier of the target AMF, in other words, an address of the target AMF for load relocation, and send a message related to the UE to the target AMF for load relocation. It should be noted that the AMF identifier may be in any formats uniquely identifying an AMF, for example, a name in format of a character string, a fully qualified domain name (FQDN), or a globally unique AMF identifier (GUAMI). In the technical solution provided in the embodiments of this application, the AMF and the RAN do not need to perform, for each UE, signaling exchange related to UE relocation. For example, the AMF and the RAN do not need to page the UE or instruct the UE to initiate location update or new registration. In addition, the AMF does not need to send a message to the RAN for each UE to delete an AMF ID in a context of the UE stored in the RAN. Therefore, signaling overheads are greatly reduced and a large quantity of network resources are saved.

In this embodiment of this application, a specific form in which the RAN stores the AMF routing information is not limited. The RAN may store the AMF routing information in a form of an AMF routing table, or may store the AMF routing information in other forms other than a routing table. For example, the RAN stores an AMF ID table and an AMF address table, and the two tables both include AMF names as indexes. In this case, a correspondence between AMF IDs and AMF addresses may also be established. For ease of description, in this embodiment of this application, the technical solution in this application is described by using an AMF routing table as an example. It should be noted that all solutions in which the routing information is recorded in another form shall fall within the protection scope of this application provided that functions of the solution in this embodiment of this application are implemented.

It is assumed that the 5G core network in this embodiment of this application includes four AMF devices or AMF instances: respectively, an AMF 1, an AMF 2, an AMF 3, and an AMF 4. An AMF routing table stored in the RAN is shown in Table 1 and includes addresses of AMFs with respect to the RAN (shown in the second column in Table 1) and AMF IDs (shown in the third column in Table 1). For ease of description of this embodiment of this application, to help a person skilled in the art understand the technical solution, a column of AMF names (shown in the first column in Table 1) is added to Table 1. In this embodiment of this application, specific formats of the address of the AMF with respect to the RAN and the AMF ID are not limited. In Table 1, it is assumed that the AMF ID is in a binary format with a length of 2 bits (bit). Assuming that a transport layer protocol used between the AMF and the RAN is Stream Control Transmission Protocol (SCTP), the address of the AMF with respect to the RAN is an SCTP address, an SCTP port number, or the like. It should be noted that the RAN may record and store the AMF routing information shown in Table 1 in various manners and this embodiment of this application imposes no limitation thereon. For example, during network deployment, an operation and maintenance (O&M) entity performs central planning, allocates AMF IDs, and sends the AMF IDs to AMFs. When establishing a connection to the RAN, each AMF sends its AMF ID and an address of the AMF with respect to the RAN, so that the RAN generates an AMF routing table. Alternatively, the O&M entity may perform central planning, generate an AMF routing table, and send the AMF routing table to the RAN. Before the RAN receives the AMF routing table or when the RAN receives a NAS message of unregistered UE, the RAN sends the NAS message of the UE according to a locally configured policy or another routing policy, for example, a policy for ensuring load balancing among AMFs, and the RAN may evenly select AMFs for NAS message routing.

TABLE 1

| Name of AMF | Address of AMF with respect to RAN | AMF ID |
|---|---|---|
| AMF 1 | Address of the AMF 1 with respect to the RAN | 00 |
| AMF 2 | Address of the AMF 2 with respect to the RAN | 01 |
| AMF 3 | Address of the AMF 3 with respect to the RAN | 10 |
| AMF 4 | Address of the AMF 4 with respect to the RAN | 11 |

Assuming that an AMF ID+UE ID in a temporary identifier of UE is "00100100101100101 . . . ", according to the AMF routing table shown in Table 1, an AMF ID taken from the temporary identifier of the UE is "00", and the RAN should send a NAS message of the UE to the AMF 1 based on the address of the AMF 1 with respect to the RAN in Table 1.

When the AMF 1 in Table 1 needs to be shut down for an operation such as maintenance or upgrading, all UEs of the AMF 1 need to be moved to another AMF, and the AMF 1 is an original AMF for load relocation. It is assumed that the AMF 1 determines to hand over all UEs served by the AMF 1 to a currently lightest loaded AMF 2, which means that the AMF 2 is a target AMF for load relocation. In this case, the AMF 1 refreshes the AMF routing table in Table 1, and a refreshed AMF routing table is shown in Table 2. In Table 2, a NAS message of UE whose temporary identifier includes an AMF ID "00" is to be routed to the AMF 2.

TABLE 2

| Name of AMF | Address of AMF with respect to RAN | AMF ID |
|---|---|---|
| AMF 1 | NA | NA |
| AMF 2 | Address of the AMF 2 with respect to the RAN | 01 00 |
| AMF 3 | Address of the AMF 3 with respect to the RAN | 10 |
| AMF 4 | Address of the AMF 4 with respect to the RAN | 11 |

In this embodiment of this application, a length of information about UE in the AMF routing table is not limited. To be specific, a length of an AMF ID in a temporary identifier of UE in Table 1 is not limited. Therefore, when an operator needs to scale up a network, and the 2-bit AMF ID needs to be extended to identify more AMFs, the method provided in this embodiment of this application is still applicable. It is assumed that there is an excessive network load on a 5G core network. To reduce the network load and improve network reliability, an operator determines to scale up the 5G core network by newly deploying an AMF 5 and an AMF 6 in the 5G core network. Therefore, the AMF ID needs to be extended into 3 bits, and the AMF routing table shown in Table 1 is to be refreshed to obtain a new AMF routing table shown in Table 3. In Table 3, information about UE is first three high-order bits taken from an AMF ID+UE ID part in a temporary identifier of the UE. It is assumed that a temporary identifier is allocated to UE before the 5G core network is scaled up and that an AMF ID+UE ID in the temporary identifier of the UE is "00100100101100101 . . . ". Then, an AMF ID of the UE after the scaling up is "001".

TABLE 3

| Name of AMF | Address of AMF with respect to RAN | AMF ID |
|---|---|---|
| AMF 1 | Address of the AMF 1 with respect to the RAN | 000 001 |
| AMF 2 | Address of the AMF 2 with respect to the RAN | 010 011 |
| AMF 3 | Address of the AMF 3 with respect to the RAN | 100 101 |
| AMF 4 | Address of the AMF 4 with respect to the RAN | 110 111 |
| AMF 5 | Address of the AMF 5 with respect to the RAN | NA (not applicable, not applicable) NA |
| AMF 6 | Address of the AMF 6 with respect to the RAN | NA NA |

To reduce loads on the AMF 1, the AMF 2, the AMF 3, and the AMF 4 (subsequently, AMF 1-AMF 4 are used to represent a set of consecutively numbered AMFs), the AMF 1-AMF 4 each hand over some of UEs served by the AMF 1-AMF 4 to the AMF 5 and the AMF 6, and an AMF routing table after the handover is shown in Table 4. The AMF 1 hands over, to the AMF 5, UEs served by the AMF 1 whose temporary identifiers include an AMF ID "001", the AMF 2 hands over, to the AMF 5, UEs served by the AMF 2 whose temporary identifiers include an AMF ID "011", the AMF 3 hands over, to the AMF 6, UEs served by the AMF 3 whose temporary identifiers include an AMF ID "101", and the AMF 4 hands over, to the AMF 6, UEs served by the AMF 4 whose temporary identifiers include an AMF ID "111". Later, when new UE registers with the AMF 5, the AMF 5 needs to select one from "001" and "011" as an AMF ID to allocate a temporary identifier to the UE. To facilitate load balancing in subsequent load relocation, for allocation of temporary identifiers to UEs, the AMF 5 needs to select "001" and "011" as the AMF IDs based on a same probability, so as to help subsequent load relocation using the AMF IDs in the AMF routing table.

TABLE 4

| Name of AMF | Address of AMF with respect to RAN | AMF ID |
|---|---|---|
| AMF 1 | Address of the AMF 1 with respect to the RAN | 000 NA |
| AMF 2 | Address of the AMF 2 with respect to the RAN | 010 NA |

TABLE 4-continued

| Name of AMF | Address of AMF with respect to RAN | AMF ID |
|---|---|---|
| AMF 3 | Address of the AMF 3 with respect to the RAN | 100 NA |
| AMF 4 | Address of the AMF 4 with respect to the RAN | 110 NA |
| AMF 5 | Address of the AMF 5 with respect to the RAN | 001 011 |
| AMF 6 | Address of the AMF 6 with respect to the RAN | 101 111 |

In addition, based on the AMF routing table shown in Table 3, if the AMF 1 needs to be shut down for an operation such as maintenance or upgrading simultaneously when the operator scales up the network, the AMF 1 also supports handover of UEs served by the AMF 1 to a plurality of AMFs. For example, UEs whose temporary identifiers include an AMF ID 001 are moved to the AMF 5, and UEs whose temporary identifiers include an AMF ID 000 are moved to the AMF 2. Then, an AMF routing table after the handover is shown in Table 5.

TABLE 5

| Name of AMF | Address of AMF with respect to RAN | AMF ID |
|---|---|---|
| AMF 1 | NA | NA NA |
| AMF 2 | Address of the AMF 2 with respect to the RAN | 010 000 |
| AMF 3 | Address of the AMF 3 with respect to the RAN | 100 NA |
| AMF 4 | Address of the AMF 4 with respect to the RAN | 110 NA |
| AMF 5 | Address of the AMF 5 with respect to the RAN | 001 011 |
| AMF 6 | Address of the AMF 6 with respect to the RAN | 101 111 |

It should be noted that the solution provided in this embodiment of this application in which the AMF sends, during load relocation, the AMF routing information that is effective after the load relocation to the RAN, is intended to instruct the RAN to send a NAS message of UE that is registered (or already has a temporary identifier of the UE) to the target AMF for load relocation, so as to implement load relocation and load balancing. A message carrying the AMF routing information may be sent by the AMF whose load is to be relocated or may be sent by the O&M entity. This is not limited in this embodiment of this application.

The concept and principle of the AMF routing table have been clarified by using the foregoing tables and corresponding explanations. The following describes a load relocation method provided in the embodiments of this application by using diagrams of message flows.

Figure 3A:
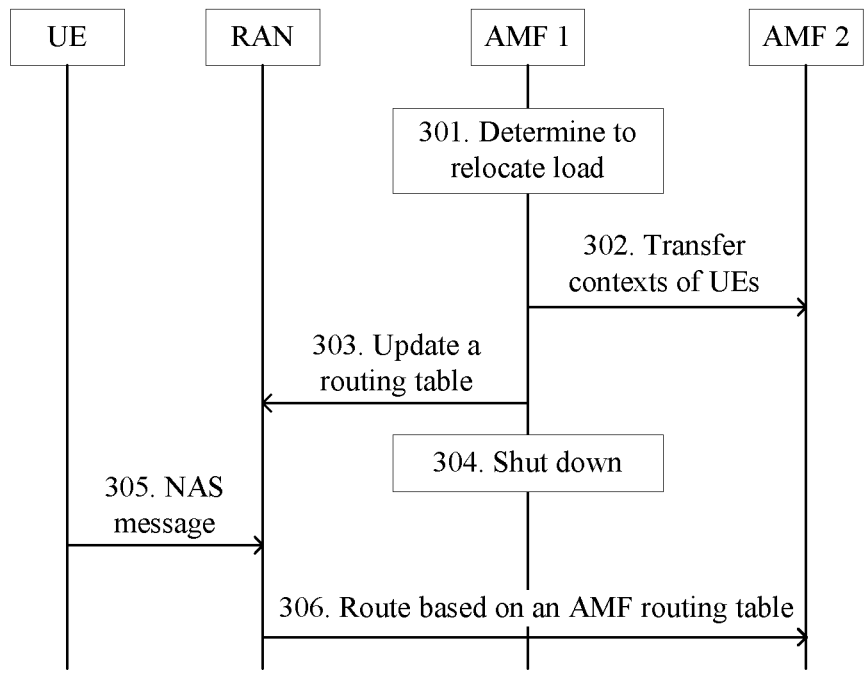
FIG. 3a is a schematic flowchart of a load relocation method according to an embodiment of this application.

FIG. 3a is a flowchart of a method for AMF load relocation based on an AMF routing table. In a scenario in which an AMF 1 needs to be shut down or be scaled down or in which an AMF 2 needs to be scaled up, load relocation needs to be performed for the AMF 1, to hand over all UEs registered with the AMF 1 to the AMF 2 (as shown in Table 1 and Table 2) or hand over some UEs registered with the AMF 1 to another AMF (as shown in Table 3 and Table 4). In FIG. 3a, assuming that a RAN has stored the AMF routing table shown in Table 1, the AMF 1 needs to be shut down and initiates load relocation to the AMF 2.

301. The AMF 1 is shut down and determines, based on a load status of other AMFs in a network or according to an instruction of an O&M entity, to hand over all UEs that are registered with the AMF 1 or that are served by the AMF 1 to the AMF 2.

302. The AMF 1 sends context information of all UEs that is stored in the AMF 1 to the AMF 2, and also needs to send an AMF ID ("00" shown in Table 2) of the AMF 1 to the AMF 2 to be used as a new AMF ID of the AMF 2 later. Context information of UE includes information of the UE such as an identifier (such as an IMSI or a temporary identifier), subscription data, security data including information related to authentication and the like, PDU session information, SMF information, and a service policy. The AMF 1 sends contexts of the UEs to the AMF 2, to ensure that the AMF 2 can continue to normally manage connectivity, sessions, and the like of the UEs and that the AMF change does not affect connectivity and services between the UEs and a 5G core network. After the load relocation, the AMF 2 has two AMF IDs: "00" and "01". Later, when another UE is connected to or registered with the AMF 2, the AMF 2 selects either AMF ID to allocate a temporary identifier to the UE. It should be noted that the AMF 1 may send, to the AMF 2 by using one message, the context information of the UEs to be moved to the AMF 2; and when an excessively large quantity of information needs to be contained in the message, the information may alternatively be divided into a plurality of messages for transfer. The context information of the to-be-moved UEs is transmitted between the two network elements or devices: the AMF 1 and the AMF 2 by using one or more device-level messages, avoiding sending a message specific to each to-be-moved UE and reducing signaling overheads between the AMF 1 and the AMF 2.

303. The AMF 1 sends a message to a RAN, where the message includes at least AMF routing information. The AMF routing information is intended to make the RAN update a correspondence between AMF IDs and AMF addresses in the AMF routing table. Later, when receiving an uplink NAS message sent by UE, the RAN queries an updated AMF routing table based on AMF ID information in a temporary identifier of the UE and sends the NAS message to an address specified in the updated AMF routing table. A specific format of the AMF routing information is not limited in this embodiment of this application, and may be specifically the complete updated AMF routing table shown in Table 2. However, in consideration of signaling and transmission overheads, the AMF routing information may alternatively include only routing information of the AMF 1 and routing information of the AMF 2 in Table 2. Alternatively, update of the AMF routing table may be indicated by using an information element. For example, the information element carries an AMF ID (00) of the original AMF for load relocation and any one AMF ID (such as 01) of a target AMF for load relocation, or carries an AMF ID (00) of the original AMF for load relocation and an address of the target AMF for load relocation with respect to the RAN (the address of the AMF 2 with respect to the RAN), to indicate the latest AMF routing information to the RAN. When a length of the AMF ID changes, the AMF 1 also needs to send, to the RAN, an updated AMF ID of the original AMF.

It should be noted that for UE that has established a signaling connection to the RAN, the RAN has stored a context of the UE, and the context of the UE stored in the RAN includes an AMF ID taken from a temporary identifier of the UE and an address of an AMF currently serving the UE with respect to the RAN. To ensure that the RAN can forward, based on the address of the AMF with respect to the RAN in the context of the UE, an uplink message of the UE to the AMF specified in the AMF routing table, when receiving the AMF routing information, the RAN further needs to refresh the context of the UE based on the AMF routing information. For example, in this embodiment, the RAN needs to search for a record in which the AMF ID is 00 in the context of the UE and refresh the address of the AMF currently serving the UE with respect to the RAN that is recorded in the record to the address of the AMF 2 with respect to the RAN, or refresh the address of the AMF currently serving the UE with respect to the RAN to an invalid value and query the AMF routing table to obtain the address of the AMF 2 with respect to the RAN next time when receiving an uplink message of the UE. In addition, for UEs that have established connections to the AMF 1 by using the RAN and for which a signaling procedure is being performed, for example, UEs in a location update procedure or an attachment procedure, the AMF 1 may further include, in the message in 303, identifiers of these UEs, for example, temporary identifiers allocated by the RAN to the UEs, to instruct the RAN to perform exceptional processing for these UEs, to be specific, to update context information of the UEs after the signaling procedures of the UEs end. Correspondingly, the AMF 1 is shut down after the signaling procedures of the UEs end.

304. The AMF 1 deletes context information of to-be-moved UEs and performs a shutdown operation.

305. UE sends an uplink NAS message to the RAN. In a case, the UE does not add a temporary identifier to the NAS message (if the UE has established a connection to the RAN before sending this message). In another case, the UE adds a temporary identifier to the NAS message (if this message is a first message for the UE to establish a connection to the RAN).

306. The RAN receives the uplink NAS message sent by the UE or locally triggers sending of an uplink message related to the UE, and the RAN performs the following operations:

If the RAN has stored context information of the UE (if the UE has established a connection to the RAN before sending the message in 305) and the context information of the UE contains an address of an AMF with respect to the RAN, the RAN sends the message to a corresponding AMF based on the address of the AMF with respect to the RAN.

If the RAN has stored context information of the UE and an address of an AMF with respect to the RAN in the context information of the UE is an invalid value, the RAN queries the updated AMF routing table based on the AMF ID recorded in the context of the UE or the AMF ID taken from the temporary identifier of the UE, to obtain an address of an AMF with respect to the RAN, and sends the message to an AMF corresponding to the address of the AMF with respect to the RAN.

If the RAN has not stored context information of the UE, the RAN takes an AMF ID from the temporary identifier of the UE based on an AMF ID+UE ID in the temporary identifier carried by the UE and a length of the AMF ID (a quantity of bits) in the updated AMF routing table, queries the updated AMF routing table to obtain an address of an AMF with respect to the RAN, and sends the message to an AMF corresponding to the address of the AMF with respect to the RAN.

If the RAN has not stored context information of the UE and the UE is connected to the 5G core network for the first time, and the message sent by the UE does not include a temporary identifier, the RAN selects an AMF for the UE for access according to a locally configured rule or another load balancing rule.

It can be learned that according to the method provided in this embodiment of this application, when an AMF needs to relocate its load, the AMF instructs, by using a device-level message, the RAN to update an AMF routing table and context information of related UEs, and the AMF does not need to send an update message to the RAN for each UE. This reduces signaling overheads and improves load relocation efficiency. The RAN also does not need to instruct the UE to initiate a location update procedure to make the RAN reselect an AMF for the UE. This reduces air interface signaling and saves air interface resources. The RAN can directly find, by updating the locally stored AMF routing table, an AMF that stores the context of the UE after load relocation, without a need of redirection between AMFs. In addition, the RAN only needs to forward a message of the UE based on the AMF routing table to ensure load balancing between AMFs. This simplifies complexity of message forwarding by the RAN.

Figure 3B:
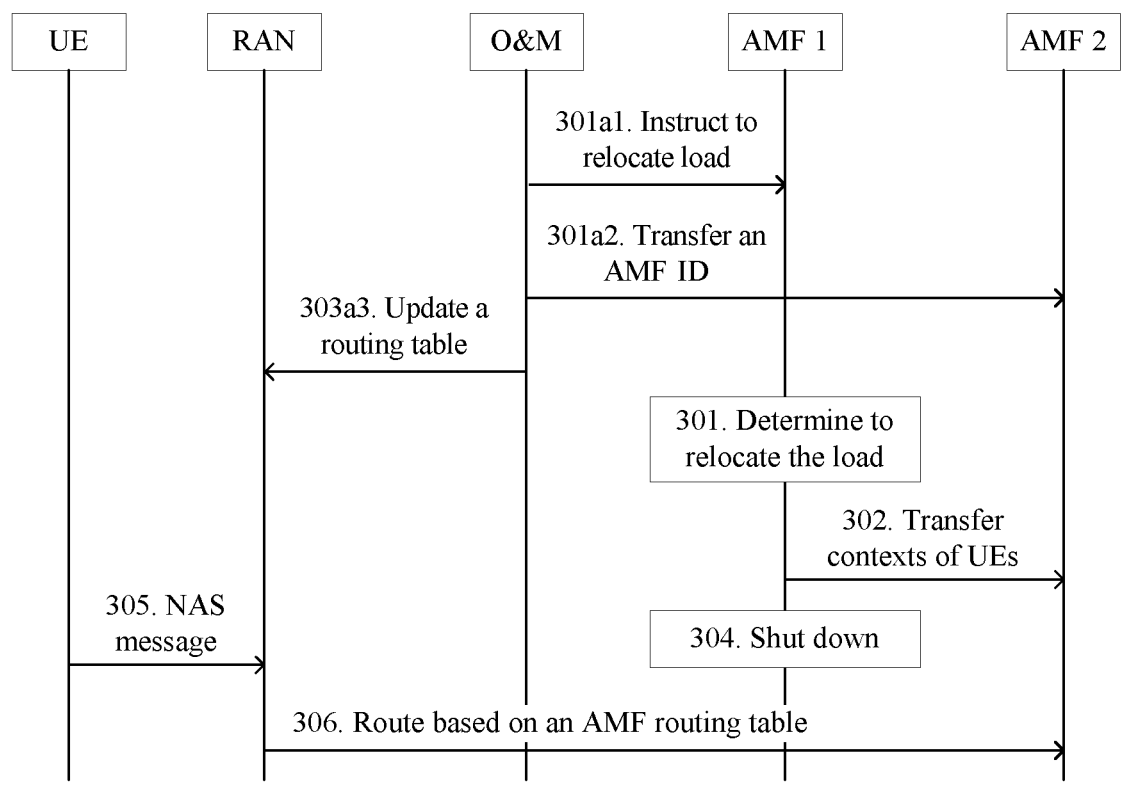
FIG. 3b is a schematic flowchart of another load relocation method according to an embodiment of this application.

It should be noted that when the O&M entity participates in the load relocation procedure, for example, when the original AMF and the target AMF for load relocation and the AMF ID of the AMF 1 whose load is to be relocated are determined by the O&M entity, some functions of the AMF 1 described in FIG. 3a may alternatively be implemented by the O&M entity. For example, in step 302, the O&M entity may send, to the AMF 2, the AMF ID of the AMF whose load is to be relocated; in step 303, the O&M entity may send the updated routing information to the RAN. A specific procedure is shown in FIG. 3b.

In step 301a1, the O&M entity determines, based on a load status of all AMFs in a current network, to relocate all load of the AMF1 to the AMF2. The O&M entity sends an AMF ID (00) of the AMF 1 (because the AMF 1 has only one AMF ID currently, the AMF ID indicates all the load of the AMF 1), and an address of the AMF 2 with respect to the AMF 1 or an identifier of the AMF 2 (for example, 01) to the AMF 1, to instruct the AMF 1 to hand over UEs corresponding to the AMF ID (00) to the AMF 2.

Optionally, in step 301a2, the O&M entity may alternatively replace the AMF 1 to send the AMF ID (00) of the AMF 1 to the AMF 2, so that the AMF 2 uses the AMF ID (00) after load relocation.

In step 303a3, the O&M entity sends AMF routing information to the RAN. For specific description of the AMF routing information, refer to the description in step 303 in FIG. 3a.

Steps 301 to 306 in FIG. 3b are essentially the same as steps 301 to 306 in FIG. 3a. A difference lies in that in FIG. 3b, because the O&M entity has sent, to the AMF 2, the AMF ID (00) of the AMF 1 whose load is to be relocated, the AMF 1 needs to transfer only contexts of the to-be-moved UEs in the message in 302; and because the O&M entity has sent the AMF routing information to the RAN in step 303a3, the AMF 1 no longer needs to send the AMF routing information to the RAN.

In FIG. 3a and FIG. 3b, the context information of the UEs is directly transferred between the AMF 1 and the AMF 2. In actual network deployment, the following manner may alternatively be used: The AMF 1 first stores the context information of the UEs in a device having a data storage function and then the AMF 2 obtains contexts of the UEs from the data storage device.

Figure 4:
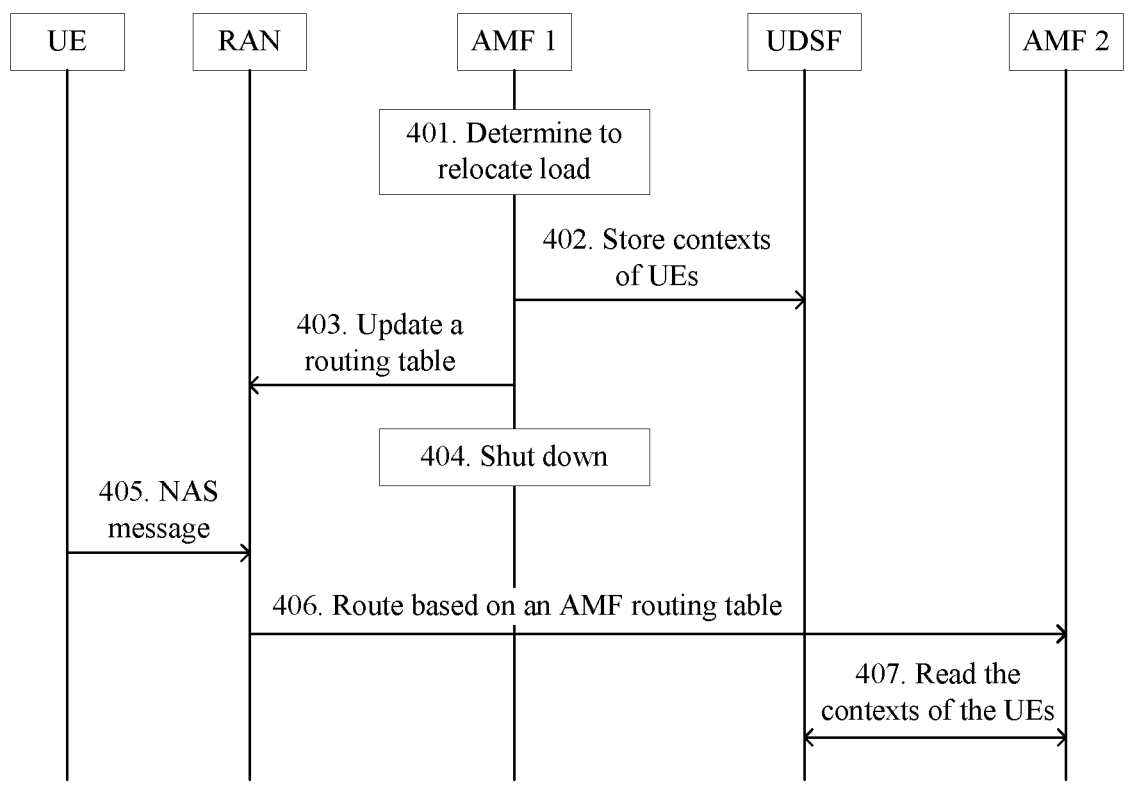
FIG. 4 is a schematic flowchart of another load relocation method according to an embodiment of this application.

FIG. 4 is a flowchart of load relocation in which context information of UE is transferred between an AMF 1 and an AMF 2 by using a Unstructured Data Storage Function (UDSF). A service scenario described in FIG. 4 and assumptions about a system are the same as those in the embodiment described in FIG. 3a. The following describes only differences between the flowchart shown in FIG. 4 and that shown in FIG. 3a. Same parts of FIG. 4 and FIG. 3a are not described herein again.

401. Refer to the description in 301.

402. The AMF 1 sends context information of UE served by the AMF 1, to the UDSF for storage. For explanation of the context of UE, refer to 302. Different from 302, in FIG. 4, an operation and maintenance system (for example, O&M) instructs the AMF 2 to update an AMF ID, and after the update, AMF IDs include 000 and 001. Certainly, alternatively, the AMF 1 may instruct the AMF 2 to update the AMF ID, to be specific, instruct the AMF 2 to use an AMF ID (000) of the original AMF 1 as an AMF ID of the AMF 2 later.

403. The AMF 1 or the O&M sends AMF routing information to the RAN. For details of the AMF routing information, refer to the description in 303. In addition, the AMF 1 further needs to send update information of contexts of the UEs to the RAN. For the update information of the contexts of the UEs, also refer to the description in 303.

404. The AMF 1 deletes context information of the to-be-moved UEs and performs a shutdown operation.

405 and 406. Refer to the descriptions in 305 and 306.

407. The AMF 2 receives the uplink message of the UE sent by the RAN and reads a context of the UE from the UDSF based on a temporary identifier of the UE carried in the message, so as to continue serving the UE.

FIG. 3a and FIG. 4 describe messaging procedures in which the AMF routing table is used to ensure normal processing of the uplink message of the UE when load of an AMF is being relocated. The solution for load location based on an AMF routing table provided in this embodiment of this application can also ensure that a downlink service or a downlink message of the UE is not affected after load of the AMF is relocated.

Figure 5:
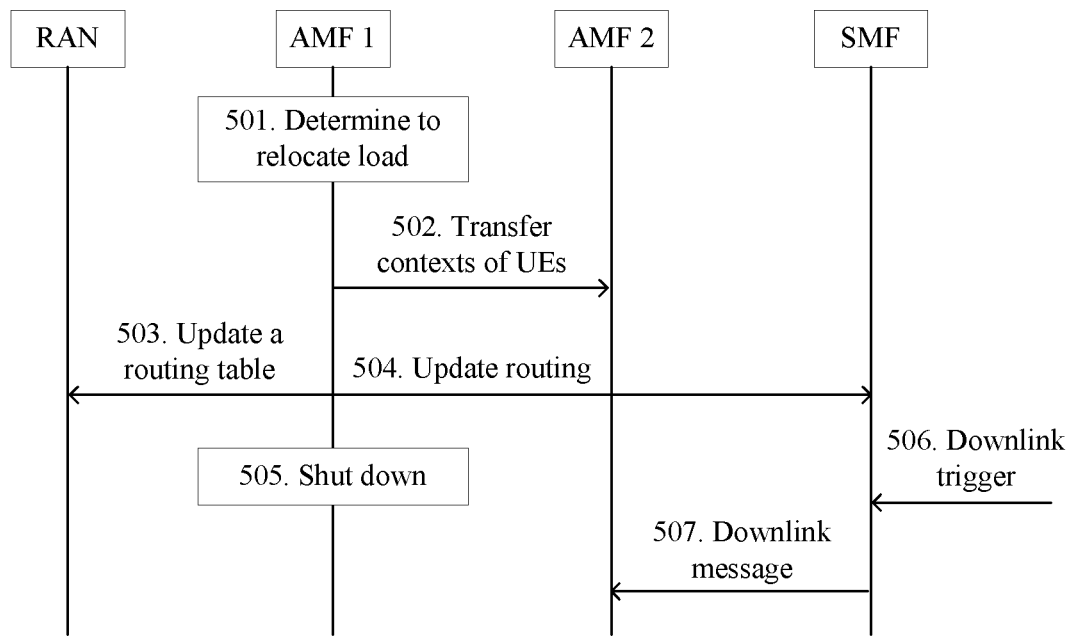
FIG. 5 is a schematic flowchart of another load relocation method according to an embodiment of this application.

Based on the service scenario and the 5G core network configuration in FIG. 3a, FIG. 5 describes how an AMF updates a context in the SMF, so that the SMF can find a correct AMF when receiving a downlink message related to UE. FIG. 5 uses an example in which the AMF is shut down for load relocation. However, the method procedure is also applicable to load relocation triggered in other service scenarios such as AMF upscaling or AMF downscaling.

501. Determine, according to an operator policy, to shut down an AMF 1 and perform load relocation.

502. The AMF 1 determines to relocate its load to an AMF 2 according to system planning (for example, an instruction of O&M), and the AMF 1 transfers context information of UE to the AMF 2. For details, refer to the description in 302.

503. The AMF 1 sends AMF routing information to a RAN. For details, refer to the description in 303.

504. The AMF 1 sends a routing update message to an SMF, where the update message includes at least an Subscriber Permanent Identity (SUPI) of the UE and an address of a target AMF to which the UE is to be moved with respect to the SMF (namely, an address of the AMF 2 with respect to the SMF), or an SUPI of the UE and an identifier of the AMF 2 (the SMF can obtain, based on the identifier of the AMF 2, an address of the AMF 2 with respect to the SMF). The SMF receives the message, retrieves corresponding context information of the UE based on the SUPI, updates an address of an AMF saved in the context information of the UE, and later when receiving a downlink message of the UE, forwards the message to the AMF 2. When the context information of the UE stored in the SMF includes an AMF ID, the routing update message may alternatively have another implementation. For example, the AMF1 may send, to the SMF, an original AMF ID (00) and the address of the target AMF with respect to the SMF, or an original AMF ID (00) and an identifier of the target AMF. After receiving the message, the SMF may traverse contexts of all UEs and update, for UE for which an AMF ID in a context is "00", an address of the AMF with respect to the SMF that is saved in the context of the UE. When a length of the AMF ID changes after relocation, the AMF also needs to send, to the SMF, an updated AMF ID in addition to the original AMF ID and the address of the target AMF with respect to the SMF or the identifier of the target AMF. In the scenario shown in Table 4, when the AMF 1 hands over UE for which an AMF ID is "001" to the AMF 5, the AMF needs to send, to the SMF, the original AMF ID (00), an address of the AMF 5 with respect to the SMF or the identifier of the AMF 5, and the updated AMF ID (001). It should be noted that different context information of UEs is stored in different devices or network elements. Contexts of UEs stored in the RAN are different from contexts of UEs stored in the SMF. In addition, the message in 503 and the message in 504 are sent in no particular order.

505. The AMF 1 is shut down.

506 and 507. The SMF receives a downlink message of the UE, performs a query based on the SUPI to obtain an AMF address, and sends the message to the AMF 2.

According to the method shown in FIG. 5, after an AMF determines to hand over UEs to a target AMF, the AMF sends a message to the SMF, to update SMF-to-AMF routing information. Later, when receiving a downlink trigger, the SMF can find, based on an updated context of UE, a corresponding AMF that the UE is moved to, thereby avoiding message redirection. In addition, in this embodiment, the message sent by the AMF to the SMF is a network element-level message, and contexts of all UEs of the SMF are updated at a time, thereby reducing a quantity of messages and reducing signaling overheads.

The foregoing mainly describes, in terms of interaction between various network elements, the solutions provided in the embodiments of this application. It can be understood that, to implement the foregoing functions, the network elements, for example the UE, the base station, and the core network entity, all include a corresponding software structure and/or software module for performing the functions. A person of ordinary skill in the art should easily be aware that units and algorithms steps in the examples described with reference to the embodiments disclosed in this specification may be implemented by hardware or a combination of hardware and computer software. Whether a function is performed by hardware or hardware driven by computer software depends on particular applications and design constraints of the technical solutions. A person skilled in the art may use a different method to implement the described functions for each particular application, but it should not be considered that the implementation goes beyond the scope of this application.

Figure 6:
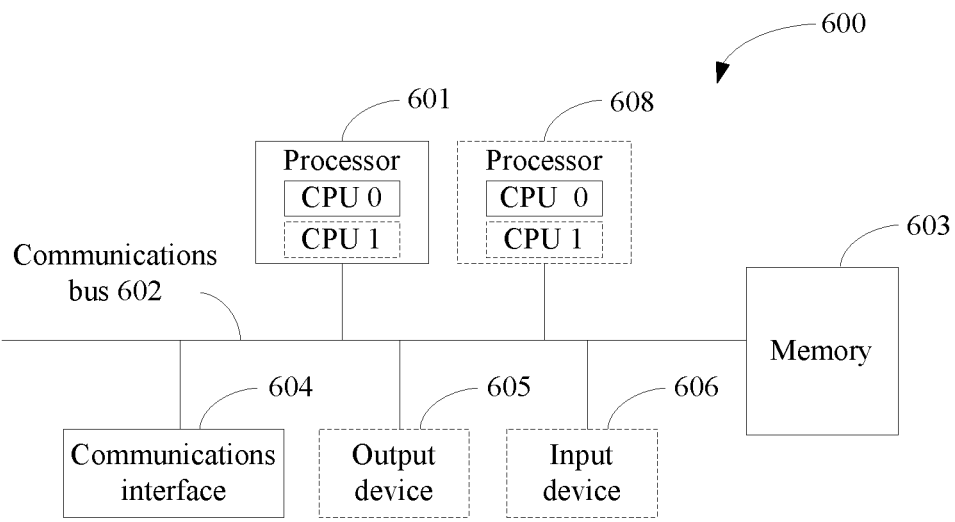
FIG. 6 is a schematic structural diagram of a computer device according to an embodiment of this application.

As shown in FIG. 6, devices, network elements, or entities such as the RAN, the AMF, the SMF, or the O&M in the foregoing method embodiments may all be implemented by a computer device (or system) in FIG. 6.

FIG. 6 is a schematic diagram of a computer device according to an embodiment of this application. The computer device 600 includes at least one processor 601, a communications bus 602, a memory 603, and at least one communications interface 604.

The processor 601 may be a general-purpose central processing unit (CPU), a microprocessor, an application-specific integrated circuit (ASIC), or one or more integrated circuits for controlling execution of a program in the solutions of this application.

The communications bus 602 may include a path for transferring information between the foregoing components.

The communications interface 604 is configured to communicate, by using any apparatuses such as a receiver, with another device or a communications network such as an Ethernet, a radio access network (RAN), or a wireless local area network (WLAN).

The memory 603 may be but is not limited to a read-only memory (ROM) or other types of static storage devices that can store static information and instructions, or a random access memory (RAM) or other types of dynamic storage devices that can store information and instructions, or may be an electrically erasable programmable read-only memory (EEPROM), a compact disc read-only memory (CD-ROM) or other optical disc storages, an optical disc storage (including a compact disc, a laser disc, an optical disc, a digital versatile disc, a Blu-ray disc, or the like), a magnetic disk storage medium or other magnetic storage devices, or any other media that can be used to carry or store expected program code in a form of an instruction or a data structure and that can be accessed by a computer. The memory may exist independently, and is connected to the processor by using the bus. The memory may alternatively be integrated with the processor.

The memory 603 is configured to store application program code for executing the solutions of this application, and the processor 601 controls the execution. The processor 601 is configured to execute the application program code stored in the memory 603, so as to implement functions in the patent method.

In specific implementation, in an embodiment, the processor 601 may include one or more CPUs, for example, a CPU 0 and a CPU 1 in FIG. 6.

In specific implementation, in an embodiment, the computer device 600 may include a plurality of processors, for example, the processor 601 and a processor 608 in FIG. 6. Each of these processors may be a single-core (single-CPU) processor, or may be a multi-core (multi-CPU) processor. The processor herein may be one or more devices, circuits, and/or processing cores for processing data (for example, computer program instructions).

In specific implementation, in an embodiment, the computer device 600 may further include an output device 605 and an input device 606. The output device 605 communicates with the processor 601, and may display information in a plurality of manners. For example, the output device 605 may be a liquid crystal display (LCD), a light emitting diode (LED) display device, a cathode ray tube (CRT) display device, or a projector (projector). The input device 606 communicates with the processor 601, and may receive a user input in a plurality of manners. For example, the input device 606 may be a mouse, a keyboard, a touchscreen device, or a sensor device.

The computer device 600 may be a general-purpose computer device or a special-purpose computer device. In specific implementation, the computer device 600 may be a desktop computer, a portable computer, a network server, a personal digital assistant (PDA), a mobile phone, a tablet computer, a wireless terminal device, a communications device, an embedded device, or a device with a structure similar to that in FIG. 6. A type of the computer device 600 is not limited in this embodiment of this application.

For example, the RAN in the embodiments of the present invention may be the device shown in FIG. 6. A memory of the RAN stores software code that can perform the method in the embodiments of the present invention. A processor of the RAN executes application program code stored in the memory, to implement the functions of the RAN in the patent method.

In the embodiments of this application, the RAN and the access management entity may be divided into functional modules. For example, each functional module may be corresponding to one function, or two or more functions are integrated into one module. The integrated module may be implemented in a form of hardware, or may be implemented in a form of a software functional module. It should be noted that the module division in the embodiments of this application is an example, and is merely logical function division and may be other division in actual implementation.

Figure 7:
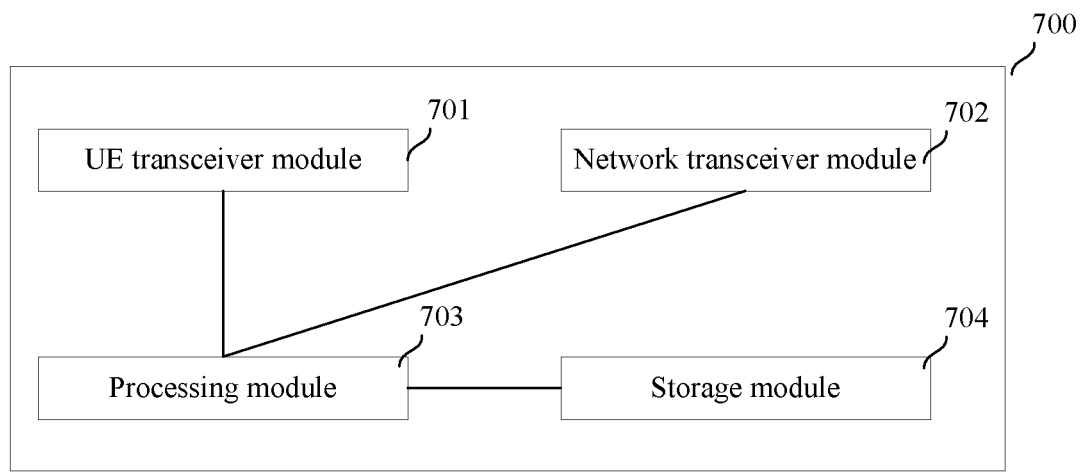
FIG. 7 is a schematic diagram of functional modules of an access network entity according to an embodiment of this application.

FIG. 7 is a schematic diagram of possible functional modules of the RAN in the foregoing embodiments. The device 700 includes a UE transceiver module 701, a network transceiver module 702, a processing module 703, and a storage module 704. The UE transceiver module 701 is configured to communicate with UE, to send a downlink message to the UE or receive an uplink message sent by the UE. The network transceiver module 702 is configured to communicate with a network element or a device in a 5G core network, to receive a message sent by an AMF or an O&M or send a message to the AMF or the O&M. The processing module 703 is configured to process a message received by the 701 or 702 or generate a message to be sent to the UE or the 5G core network, and the message is sent by using the 701 or 702. In addition, information obtained in a message processing process, for example, the AMF routing table or the context information of the UE in the embodiments of this application, is stored in the storage module 704. The storage module 704 is configured to store information obtained after processing or parsing by the processing module 703 and provide an interface for the processing module 703 to perform information query. For example, when the RAN receives an uplink message of the UE, the processing module 703 queries the AMF routing table or the context information of the UE in the storage module 704, to determine an address of an AMF with respect to the RAN.

The functional module may be implemented in a form of hardware, or may be implemented in a form of a software functional module. In a simple embodiment, a person skilled in the art may figure out that the form shown in FIG. 6 may be used for the RAN 700. For example, the processing module 703 in FIG. 7 may be implemented by invoking code in the memory 603 by the processor 601 in FIG. 6. This is not limited in this embodiment of this application.

Figure 8:
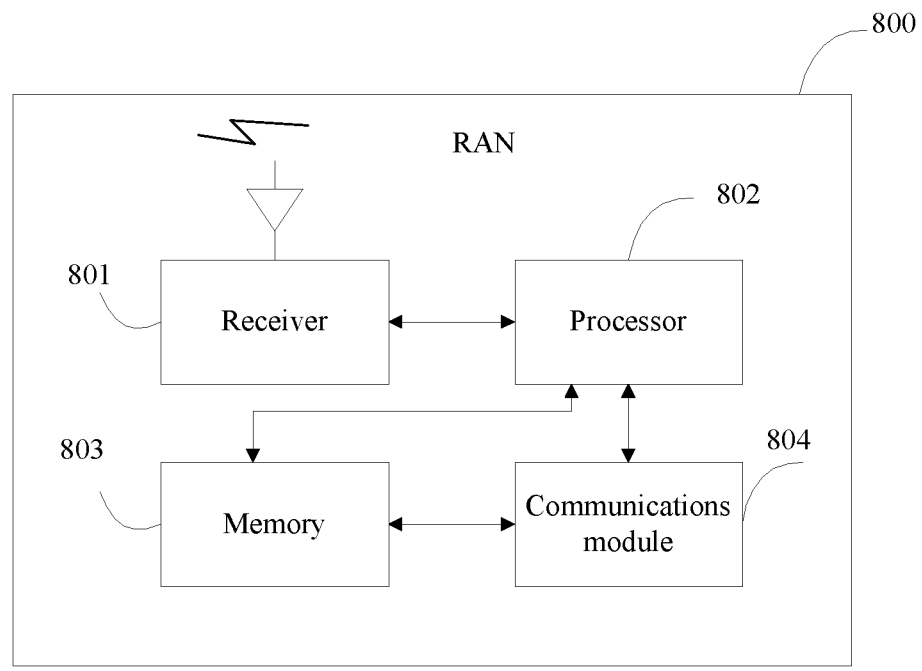
FIG. 8 is a schematic structural diagram of an access network entity according to an embodiment of this application.

FIG. 8 is a possible schematic structural diagram of the RAN in the foregoing embodiments, including a receiver 801, a processor 802, a memory 803, and a communications module 804. The receiver 801 is configured to support transmission/reception of information to/from the UE in the foregoing embodiments. The processor 802 performs various functions for communicating with the UE. On an uplink, an uplink signal from the UE is received by an antenna, demodulated by the receiver 801, and further processed by the processor 802 to recover service data and signaling information sent by the UE. On a downlink, service data and signaling messages are processed by the processor 802, and modulated by the transmitter 801 to generate a downlink signal that is transmitted to the UE by the antenna. The processor 802 also performs the processing process related to the RAN in FIG. 3a to FIG. 5 and/or other processes used for the technology described in this application. The memory 803 is configured to store program code and data (for example, AMF routing information and context information of UEs) of the base station. The communications module 804 is configured to support the RAN in communicating with other network entities, for example, configured to support the RAN in communicating with the access management entity shown in FIG. 1, for example, an AMF in a 5G core network.

Figure 9:
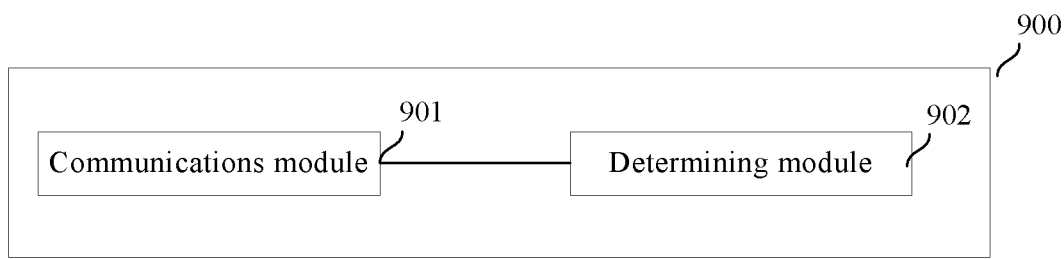
FIG. 9 is a schematic diagram of functional modules of a communications network entity according to an embodiment of this application.

FIG. 9 is a schematic diagram of possible functional modules of the communications network entity in the foregoing embodiments, for example, the original access management entity or the operation and maintenance entity. The communications network entity 900 includes a communications module 901 and a determining module 902. The communications module 901 is configured to communicate with external entities, for example, a RAN and a target access management entity. The determining module 902 is configured to determine a target access management entity for load relocation and send, to the RAN by using the communications module, a correspondence between an identifier of the original access management entity and an address of the target access management entity with respect to the RAN, so that the RAN sends, to the address of the target access management entity with respect to the RAN, a message from UE based on an identifier of the original access management entity that is carried in a message of the UE or based on an identifier of the original access management entity currently serving the UE that is stored in the RAN. The determining module 902 is further configured to determine the identifier of the original access management entity for relocation and send the identifier to the target access management entity by using the communications module 901, so that the target access management entity uses the identifier of the original access management entity as an identifier of the target access management entity after load relocation. When the communications network entity 900 is the original access management entity, the determining module 902 is further configured to determine a context of to-be-moved UE and send the context of the to-be-moved UE to the target access management entity or a data storage functional entity by using the communications module 901. In addition, the communications module 901 is further configured to communicate with a session management entity currently serving the UE. The determining module 902 is further configured to determine a correspondence between the identifier of the original access management entity and an address of the target access management entity with respect to the session management entity and send the correspondence to the session management entity by using the communications module 901. When the communications network entity 900 is an operation and maintenance entity, the communications module 901 further needs to communicate with the original access management entity and sends, to the original access management entity, the identifier of the original access management entity for relocation and an address of the target access management entity with respect to the original access management entity. The identifier of the original access management entity is used by the original access management entity to determine the to-be-moved UE. The address of the target access management entity with respect to the original access management entity helps the original access management entity send a context of the to-be-moved UE to the target access management entity.

The functional module may be implemented in a form of hardware, or may be implemented in a form of a software functional module. In a simple embodiment, a person skilled in the art may figure out that the form shown in FIG. 6 may be used for the communications network entity 900. For example, the determining module 902 in FIG. 9 may be implemented by invoking code in the memory 603 by the processor 601 in FIG. 6. This is not limited in this embodiment of this application.

All or some of the foregoing embodiments may be implemented by using software, hardware, firmware, or any combination thereof. When software is used to implement the embodiments, the embodiments may be implemented entirely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, a computer, server, or a data center to another website, computer, server, or data center in a wired (for example, through a coaxial cable, an optical fiber, or a digital subscriber line (DSL)) or wireless (for example, through infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, Solid State Disk (SSD)), or the like.

The objectives, technical solutions, and benefits of this application are further described in detail in the foregoing specific embodiments. A person skilled in the art should understand that the foregoing descriptions are merely specific implementations of this application, but are not intended to limit the protection scope of this application. Any modification, equivalent replacement or improvement made on the basis of the technical solutions in this application shall fall within the protection scope of this application. In the claims, the word "comprising" does not exclude other components or steps, and "a" or "one" does not exclude a plurality. A single processor or other units may implement some functions enumerated in the claims. Some measures are described in dependent claims that are different from each other, but this does not mean that these measures cannot be combined to produce a good effect.

The invention claimed is:

1. A load relocation method, comprising:
   determining, by an original access management entity, a target access management entity;
   sending, by the original access management entity to an access network entity, an identifier of the original access management entity and an address of the target access management entity, wherein the original access management entity being unable to continue to provide service for a user equipment (UE) causes the access network entity to obtain the identifier of the original access management entity from stored context of the UE that is stored in the access network entity and send a message of the UE to the target access management entity corresponding to the identifier of the original access management entity; and sending, by the original access management entity to a session management entity currently serving the UE, the identifier of the original access management entity and the address of the target access management entity to cause the session management entity to send a message of the UE to the target access management entity based on the identifier of the original access management entity.

2. The method according to claim 1, further comprising:
sending, by the original access management entity, the identifier of the original access management entity to the target access management entity, wherein after the UE is moved to the target access management entity, the target access management entity selects the identifier of the original access management entity as an identifier of the target access management entity to serve the UE.

3. The method according to claim 1, further comprising:
sending, by the original access management entity, the stored context of the UE that is stored in the access network entity to the target access management entity.

4. The method according to claim 1, wherein the identifier of the original access management entity is a fully qualified domain name (FQDN) or a globally unique Access and Mobility Management Function (AMF) identifier (GUAMI).

5. The method according to claim 1, wherein the message of the UE is a message addressed to the UE.

6. The method according to claim 1, wherein the address of the target access management entity is the address of the target access management entity with respect to the access network entity.

7. The method according to claim 1, further comprising:
obtaining, by the access network entity, the identifier of the original access management entity from the stored context in case that the original access management entity is unable to continue to provide service for the user equipment; and
sending, by the access network entity, the message of the UE to the target access management entity corresponding to the identifier of the original access management entity.

8. The method according to claim 1,
wherein the access network entity invalidates association between the identifier of the original access management entity and the address of the original access management entity.

9. A load relocation method, comprising:
receiving, by an access network entity from an original access management entity, an identifier of the original access management entity and an address of a target access management entity;
obtaining, by the access network entity, an address of the original access management entity based on the identifier of the original access management entity;
invalidating, by the access network entity, association between the identifier of the original access management entity and the address of the original access management entity;
based on the association between the identifier of the original access management entity and the address of the original access management entity being invalidated, obtaining, by the access network entity from stored context of a user equipment (UE) that is stored in the access network entity, the identifier of the original access management entity currently serving the UE; and
sending, by the access network entity, a message of the UE to the target access management entity based on the identifier of the original access management entity.

10. The method according to claim 9, further comprising:
determining, by the access network entity, a to-be-updated context of the UE based on the identifier of the original access management entity, wherein an identifier of an access management entity currently serving the UE included in the to-be-updated context of the UE is the same as the identifier of the original access management entity; and
setting, by the access network entity, an address of the access management entity serving the UE to an invalid value, with the address of the access management entity serving the UE included in the to-be-updated context of the UE.

11. The method according to claim 9, wherein the identifier of the original access management entity is a fully qualified domain name (FQDN) or a globally unique Access and Mobility Management Function (AMF) identifier (GUAMI).

12. The method according to claim 9, wherein the message of the UE is a message addressed to the UE.

13. The method according to claim 9, wherein the address of the target access management entity is the address of the target access management entity with respect to the access network entity.

14. A system, comprising:
a first device; and
a second device,
wherein the first device comprises an original access management entity configured to:
determine a target access management entity; and
send, to an access network entity, an identifier of the original access management entity and an address of the target access management entity;
wherein the second device comprises the access network entity configured to:
in response to the original access management entity being unable to continue to provide service for a user equipment (UE), obtain the identifier of the original access management entity from stored context of the UE that is stored in the access network entity;
send a message of the UE to the target access management entity corresponding to the identifier of the original access management entity; and
send, to a session management entity currently serving the UE, the identifier of the original access management entity and the address of the target access management entity to cause the session management entity to send a message of the UE to the target access management entity based on the identifier of the original access management entity.

15. The system according to claim 14, wherein the original access management entity is further configured to send the stored context of the UE that is stored in the access network entity to the target access management entity, wherein the target access management entity serves the UE based on the stored context.

16. The system according to claim 14, wherein the identifier of the original access management entity is a fully qualified domain name (FQDN) or a globally unique Access and Mobility Management Function (AMF) identifier (GUAMI).

17. The system according to claim 14, wherein the address of the target access management entity is the address of the target access management entity with respect to the access network entity.

18. The system according to claim 14, wherein the access network entity is further configured to:
invalidate association between the identifier of the original access management entity and the address of the original access management entity.

19. An access network entity, comprising:
at least one processor; and
a non-transitory computer-readable storage medium coupled to the at least one processor and configured to store instructions for execution by the at least one processor, wherein the instructions, when executed, cause the access network entity to:
receive, from an original access management entity, an identifier of the original access management entity and an address of the target access management entity;
obtain an address of the original access management entity based on the identifier of the original access management entity;
invalidate association between the identifier of the original access management entity and the address of the original access management entity;
based on the association between the identifier of the original access management entity and the address of the original access management entity being invalidated, obtain, from stored context of a user equipment (UE) that is stored in the access network entity, the identifier of the original access management entity currently serving the UE; and
send a message of the UE to the target access management entity based on the identifier of the original access management entity.

20. The access network entity according to claim 19, wherein the identifier of the original access management entity is a fully qualified domain name (FQDN) or a globally unique Access and Mobility Management Function (AMF) identifier (GUAMI).

21. The access network entity of claim 19, wherein the message of the UE is a message addressed to the UE.

22. The access network entity according to claim 19, wherein the address of the target access management entity is the address of the target access management entity with respect to the access network entity.

* * * * *